United States Patent [19]

Grousseau

[11] 4,417,250
[45] Nov. 22, 1983

[54] MONITORING DEVICE FOR A RADIO NAVIGATION SYSTEM OF THE DOPPLER VOR TYPE

[75] Inventor: Alain Grousseau, Paris, France

[73] Assignee: Thomson-CSF, Paris, France

[21] Appl. No.: 235,516

[22] Filed: Feb. 18, 1981

[30] Foreign Application Priority Data

Feb. 26, 1980 [FR] France ............................ 80 04212

[51] Int. Cl.³ .............................................. G01S 1/40
[52] U.S. Cl. .................................... 343/405; 343/402
[58] Field of Search ..... 343/106 R, 113 DE, 100 AP, 343/106 D, 108 M, 703

[56] References Cited

U.S. PATENT DOCUMENTS

| | | | |
|---|---|---|---|
| 3,115,633 | 12/1963 | Kramer et al. | 343/113 DE |
| 3,290,685 | 12/1966 | Steiner | 343/113 DE |
| 3,778,831 | 12/1973 | Marchand | 343/113 DE X |
| 3,958,244 | 5/1976 | Lee et al. | 343/106 D |
| 4,005,427 | 1/1977 | Hofgen | 343/106 D |
| 4,195,262 | 3/1980 | King | 343/100 AP X |

OTHER PUBLICATIONS

"VOR and Doppler VOR" by Hofgen, Electrical Communication, vol. 50, No. 4, 1975, pp. 245-248.
"Doppler VOR Ground Equipment" by W. J. Crone et al., Electrical Communication, vol. 43, No. 2, 1968, pp. 143-149.
"The Philips Doppler VOR Beacon RN200" by F. L. van den Berg, Philips Telecommunication Review, vol. 34, No. 1, Apr. 1976, pp. 1-10.
"The Philips VOR Beacon Type RN100" by F. L. van den Berg et al., Philips Telecommunication Review, vol. 32, No. 3, Aug. 1974, pp. 105-116.

Primary Examiner—Maynard R. Wilbur
Assistant Examiner—Robert C. Burk

[57] ABSTRACT

A device for monitoring a Doppler VOR system emitting sinusoidal signals at a frequency of 30 Hz, one called "reference" and the other called "variable" whose phase varies with respect to that of the first signal, comprises at least one sensor close to the Doppler VOR system, a first processing device supplying the information emitted by the VOR system in the direction of the sensor and a second device for processing the signal received by the central antenna, said devices comprising means for separating the two upper and lower side-bands of the VHF carrier wave.

5 Claims, 4 Drawing Figures

MONITORING DEVICE FOR A RADIO NAVIGATION SYSTEM OF THE DOPPLER VOR TYPE

BACKGROUND OF THE INVENTION

The presnet invention relates to a device for monitoring a radio navigation system of the Doppler VOR type.

A VOR system, i.e. a very high frequency omnidirectional radio beacon, enables any aircraft equipped with an appropriate receiver to be supplied with bearing information relative to this beacon on the ground whose geographical position is known. The increase in air traffic, not only national but also international, and in the number of air ways compels all countries to have a radioelectric cover as sure and reliable as possible. This cover is partly provided by the VOR systems which mark out the air routes.

With the VOR system radiating a signal in the metric band, i.e. 108–118 MHz, the quality of this signal depends very largely on the site on which the VOR is installed. In fact, the omnidirectional radiation reflected by obstacles generates errors such that they may make the system unusable. This is why, in hilly sites, the conventional VOR is replaced by the Doppler VOR, whose principles will be outlined hereafter.

Generally, a VOR system causes the phase difference existing between two sinusoidal signals at a frequency of 30 Hz, which modulate a very high frequency carrier frequency, to correspond to the azimuth angle $\theta$ of the aircraft with respect to the magnetic North of the site of the ground emitter. For this, the antennae forming the VOR system radiate a very high frequency VHF carrier wave modulated in amplitude on the one hand by a first low frequency sinusoidal wave at a frequency of 30 Hz and, on the other hand, by a second low frequency wave at a frequency 9960 Hz, itself modulated in frequency by a sinusoidal signal at a frequency of 30 Hz.

A conventional VOR system radiates two signals:
- a "reference" signal, radiated omnidirectionally, formed by an HF carrier modulated in amplitude by a sub-carrier at 9960 Hz, itself frequency modulated by a sinusoidal 30 Hz signal;
- a "variable" signal radiated in a figure-of-eight pattern rotating at 30 revolutions per second and in which the LF envelope of the side-bands has a phase which is characteristic of the azimuth.

These two signals combine in space to give the complete VOR signal.

On the other hand, in a Doppler VOR system, the transmission mode for Reference and Variable information is reversed with respect to the conventional VOR. Thus, the 30 Hz reference signal is transmitted omnidirectionally by amplitude modulation of the VHF wave, and the azimuth information is transmitted by frequency modulation at 30 Hz of the two side-bands at ±9960 Hz of the carrier wave. These two side-bands are emitted independently of each other by two separate circuits. The omnidirectional pattern transmitting the reference information is radiated by the central antenna, whereas the other pattern containing the azimuth information is obtained by causing to rotate through a circle having a perimeter equal to the modulation index, in wavelengths at the operating frequency, two diametrically opposite antennae each fed by one of the side-bands at ±9960 Hz of the carrier frequency. The rotational frequency of these antennae is 30 Hz. For obvious practical reasons, the rotation of these antennae is simulated by switching several antennae, to the number of N, placed in a circle while applying an appropriate weighting function to the feeding of these antennae so as to simulate the progressive movement of the emission point from one antennae to the other.

The use of the standardized VOR system by the International Civil Aviation Organization (ICAO) requires a control device monitoring the integrity of the signal emitted by the VOR and for that, especially the proper operation of the switching of the N antennae, in the case of a Doppler VOR.

In the conventional VOR system, the antennae radiating the two signals for amplitude modulation of the VHF carrier wave are implanted on the same vertical axis, so that it is possible to place a proximity sensor, at a distance of a few wave lengths $\lambda$ for example. When this sensor is preferably placed at one of the points of intersection of the two principal lobes of the radiation pattern of the side-bands emitted by the antennae, the signal picked up by the sensor in this direction is representative of that emitted in all directions.

In the Doppler VOR system, the signal coming from a sensor close to the antennae does not faithfully represent the radiation emitted to infinity in this direction because of the spread of the antennae network which is too large. The parallax effect gives to this signal a parasite phase modulation of the ±9960 Hz side-bands greater than 200° peak to peak for a sensor situated at a distance equal to $5\lambda$, i.e. about 14 meters from the central antenna. It prevents then the envelope detection of an amplitude modulated wave. This sensor must then be pushed back to more than 100λ for this modulation to drop below 10 degrees peak to peak ($\lambda$ being the wavelength at the operating frequency). Furthermore, there exists no privileged direction in which the information received by the sensor is representative of that received in the other direction, contrary to the conventional VOR. To control the Doppler VOR system, it is then necessary to have several distant sensors disposed in different directions. But it is sometimes difficult, if not impossible, to set them up especially in hilly sites. These conditions worsen when, in order to plot a maintenance error curve, twelve at least of these sensors are required. Furthermore, we saw above that the two ±9960 Hz side-bands were emitted independently of each other, so that the effective control of the integrity of the emission of the VOR system requires the complete restitution of each of the bands.

SUMMARY OF THE INVENTION

The aim of the invention is then to provide a monitor device for a radio navigation system of the Doppler VOR type, comprising a special system for processing the signal picked up by one or more sensors placed in the vicinity of the system. This device enables transmission breakdowns of the antennae to be detected, so as to be able to guarantee the quality of the signal supplied to the aircraft, whatever its azimuth.

According to one characteristic of the invention, the monitor device for a radio navigation system of the Doppler VOR type, which system comprises a central antenna radiating omnidirectionally a very high frequency carrier wave amplitude modulated by a first so-called "reference" sinusoidal signal at a frequency of 30 Hz and a circular network of antennae radiating the two ±9960 Hz side-bands of the amplitude modulation of the VHF carrier wave, these side-bands being themselves frequency modulated by a second so-called "variable" sinusoidal signal at a frequency of 30 Hz, whose phase varies with respect to that of the first 30 Hz signal, comprising at least one sensor placed in the vicinity of the transmitting antennae of the VOR system, a first device for processing the signal received by the sensor and a second device for processing the signal received by the central antenna, wherein the two processing devices comprise means for separating the two upper and lower side-bands.

The control device fully restores each of the two ±9960 Hz side-bands. Furthermore, since the normal receiver carried on board only uses the part of these side-bands in phase with the frequency of the VHF carrier wave, this control device requires control of the phase of the phantom carrier of the side-bands with that of the VHF wave and control of the switching of the antennae.

DESCRIPTION OF THE DRAWINGS

Other advantages and characteristics of the invention will appear in the following description, illustrated by the following figures showing non limiting embodiments.

Identical elements in the different figures which have the same functions bear the same references and will not be described twice.

DESCRIPTION OF THE PREFERRED EMBODIMENTS

Figure 1:
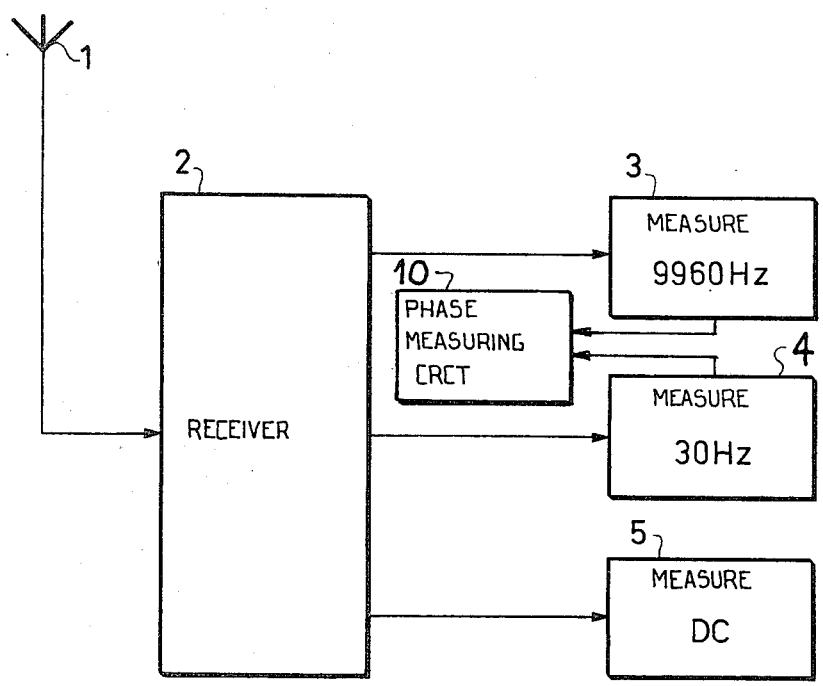
FIG. 1 shows a block diagram of a device for monitoring a Doppler VOR system, in accordance with the prior art.

According to the prior art, the control device for a Doppler VOR system breaks down into two parts, a first system for monitoring/controlling the VOR signal emitted, represented in FIG. 1, and a second system for controlling the switching of the N antennae radiating the "variable" 30 Hz signal.

The control of the signal emitted is then achieved by means of a sensor 1, formed for example by a receiving antenna of the Yagi type set up at about 250 meters from the station, followed by a conventional receiver 2. Four conventional measuring circuits 3, 4, 5 and 10 enable the following parameters to be checked:

circuit 3: the modulation rate of the ±9960 Hz sidebands of the VHF carrier wave;
circuit 4: the modulation rate of the "reference" 30 Hz signal;
circuit 5: the HF level of the continuous component of the signal emitted by the VOR system;
circuit 10: the phase difference between the "reference" 30 Hz signal and the "variable" 30 Hz signal.

Control of the switching of the antennae emitting the ±9960 Hz side-bands of the amplitude modulated VHF carrier wave is achieved first of all by detection of the amplitude of the two side-bands received simultaneously by the central antenna and then by location of an amplitude modulation spectrum. Experience shows that it is difficult to ascertain the emission breakdown(s) of one side-band independently of the other.

Figure 2:
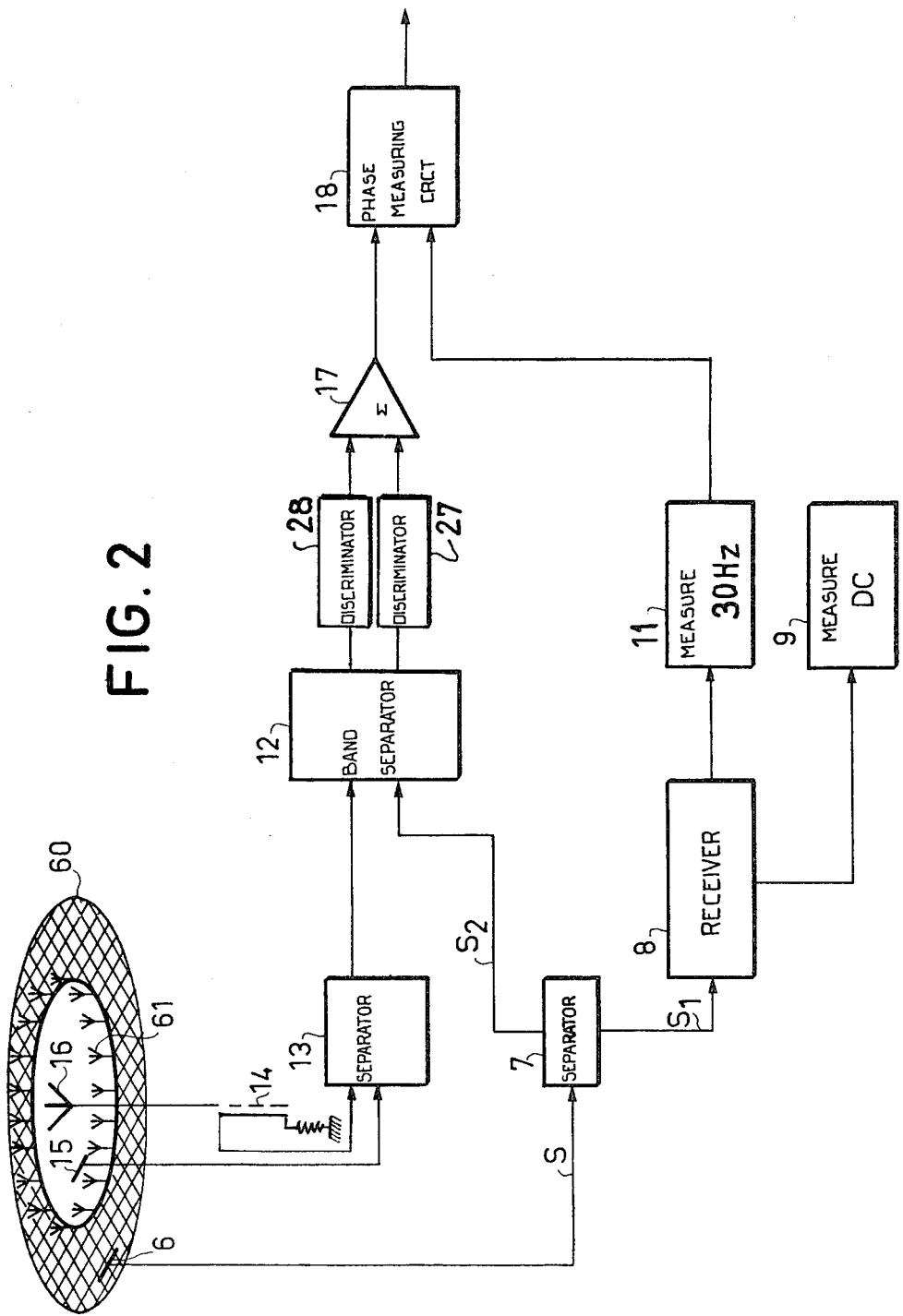
FIG. 2 shows the block diagram of a device for monitoring a Doppler VOR system, in accordance with the invention.

Since this monitor device presents the disadvantages described above, the invention relates to a new device shown in FIG. 2. It comprises a sensor 6 placed on the support 60 of the N antennae 61, so close to the Doppler VOR system. The signal S delivered by this sensor 6 is divided into two identical signals $S_1$ and $S_2$ in circuit 7. A first part $S_1$ passes through a processing chain identical to the one described in FIG. 1. This chain comprises then a receiving circuit 8 and two conventional measuring circuits of which the first 9 measures the level of the high frequency carrier wave; and the second circuit 11 allows measurement of the modulation rate of the "reference" 30 Hz signal. An assembly of means 12 providing separation of the upper and lower side-bands of the amplitude modulation of the VHF carrier wave, picked up by sensor 6, receives on the one hand the second part $S_2$ of signal S delivered by sensor 6 and, on the other hand, a standard of the carrier frequency through the separator circuit 13, this standard coming either from a coupler 14 placed on the feeder of the antenna or from a sensor 15 close to the central antenna 16. At the output of means 12, the frequency modulation signals are taken from the two side-bands by means of two discrimination circuits 27 and 28 and added in a summing circuit 17 to give the "variable" 30 Hz signal modulating in frequency the 9960 Hz signal for amplitude modulation of the VHF carrier wave. This signal as well as the 30 Hz "reference" sinusoidal signal pass through a conventional phase measuring circuit 18 which compares the phase of the first signal with respect to the second one, so that at the output of the circuit 18 the VOR information emitted in the direction of sensor 6 is obtained.

Figure 3:
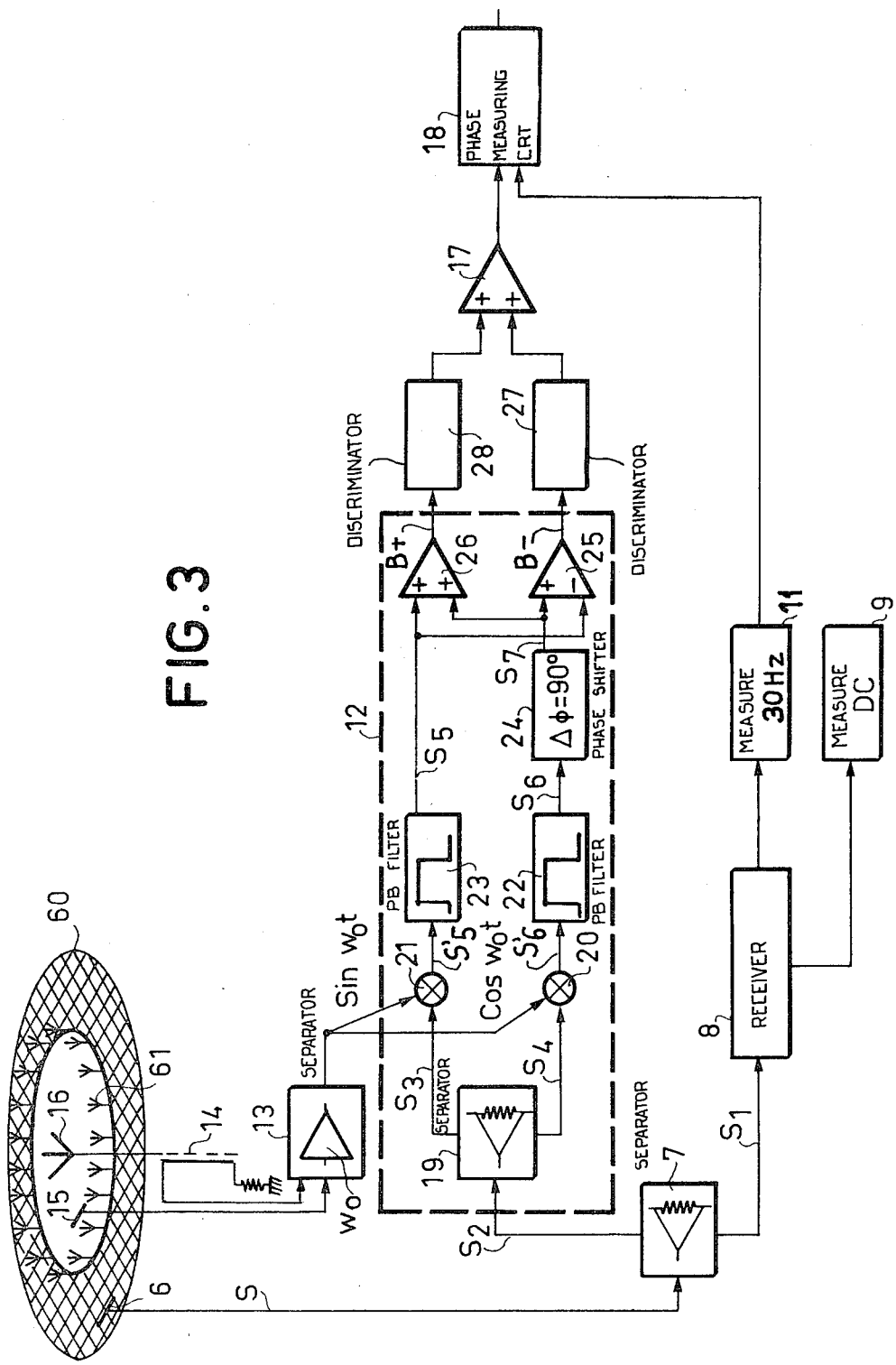
FIGS. 3 and 4 show the detailed diagrams of two non limiting embodiments of a monitor device in accordance with the invention.

In FIG. 3, the whole of means 12 providing separation of the bands picked up by sensor 6 is shown in detail. As was seen, signal S from sensor 6 is first of all divided into two by circuit 7, then the second half $S_2$ of this signal is again divided into two by circuit 19. Signals $S_3$ and $S_4$ produced by this circuit 19 each pass through a mixer 20 and 21 driven by a standard of the VHF carrier frequency coming from circuit 13. Mixer 20 receives a cos $2\pi f_o t$ frequency standard—$f_o$ being the VHF carrier frequency—delayed by $\pi/2$ with respect to the sin $2\pi f_o t$ standard received by mixer 21. This delay is produced by a quarter-wave line at the operating frequency of the system.

If we admit the following mathematical expressions for:

a carrier wave: $p = P \sin(2\pi f_o t + \alpha)$
an upper side-band: $b_S = B_S \sin[2\pi(f_o + F)t + F)t + \gamma]$
lower side-band: $b_I = B_I \sin[2\pi(f_o - \beta]$ with P, $B_S$ and $B_I$ the respective amplitudes of the three signals, $f_o$ the carrier frequency, F the frequency of the amplitude modulation signal (F+9960 Hz) and $\alpha$, $\beta$ and $\gamma$ the respective phases of the three signals due to the distance of the emitting antennae with respect to sensor 6 and to any different cause. In this case, sensor 6 receives a signal in the form:

$$S = p + b_S + b_I$$
$$= P \sin(2\pi f_o t + \alpha) + B_S \sin[2\pi(f_o + F)t + \gamma] +$$
$$B_I \sin[2\pi(f_o - F)t + \beta]$$

At the output of mixers 20 and 21, there is obtained respectively after driving by means of the sin $2\pi f_o t$ and cos $2\pi f_o t$ frequency standards, assuming $\omega_o = 2\pi f_o$ and $\Omega = 2\pi F$:

$S'_5 = S \cdot \cos \omega_o t$ and $S'_6 = S \cdot \sin \omega_o t$, namely:

$S'_5 = P'[\cos\alpha - \cos(2\omega_o - \alpha)] +$ $B_S[\cos(\Omega t - \beta) - \cos(2\omega_o - \Omega)t + \gamma)] +$ $B'_I[\cos(\Omega t + \gamma) - \cos((2\omega_o - \Omega)t + \gamma)]$ and $S_6 = P'[\sin(2\omega_o t + \alpha)] + B'_S[\sin((2\omega_o - \Omega)t + \beta) + \sin(-\Omega t + \beta)] + B'_I[\sin(2\omega_o + \Omega)t + \gamma + \sin(\Omega t + \gamma)]$ $P'$, $B_S$ and $B'_I$ being the amplitudes of the different components after passing through the divider circuits. Signals $S_5$ and $S_6$ become, after passing through the pass-band filters 22 and 23 with central frequency equal to 9960 Hz:

$S'_5 = B'_S \cos(\Omega t - \beta) + B'_I \cos(\Omega t + \gamma)$ $S'_6 = -B'_S \sin(\Omega t - \beta) + B'_I \sin(\Omega t + \gamma)$ The phase of signal $S_6$ is shifted by an angle equal to $\pi/2$, by means of phase shifter 24 and signals $S_5$ and $S_6$ thus obtained are summed in the two summing circuits 25 and 26. At the output of these two circuits 25 and 26, there are obtained respectively the upper and lower side-bands B+ and B− centered on the frequency 9960 Hz. These two signals pass through two discriminators 27 and 28 which transform the frequency variations into voltage variations. As was mentioned in connection with FIG. 2, there is obtained at the output of comparator 17 the "variable" 30 Hz signal modulating in frequency the 9960 Hz signal for amplitude modulation of the VHF carrier wave, whose variable phase is then compared with that of the "reference" 30 Hz signal in circuit 18.

Figure 4:
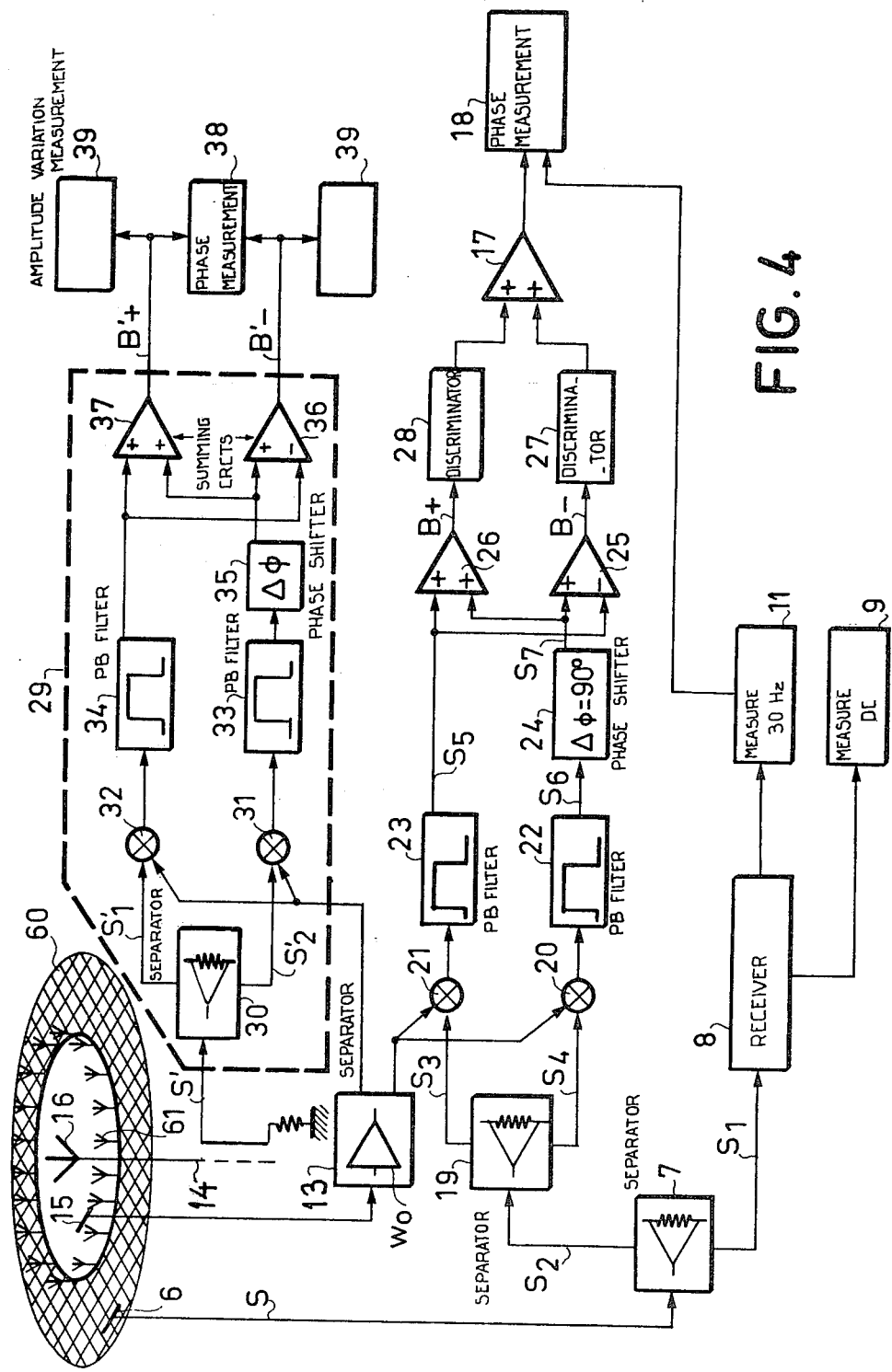

To complete this monitor device, particularly in so far as the detection of transmission breakdowns of one or more antennae is concerned, a second device is provided for processing the signal emitted by the Doppler VOR system and received by the central antenna. This second processing device comprises means for detecting antennae breakdowns and means for monitoring the phase of the phantom carrier of the ±9960 Hz side-bands with respect to that of the VHF carrier. Such means are shown in FIG. 4, in which is shown the first processing device described above.

The VOR signal is received by the central antenna 16 and picked up by the coupler 14 placed on the feeder of the antenna. The upper and lower side-bands are separated by an assembly of means 29 identical to assembly 12. In fact, the signal S' from coupler 14 is divided into two by circuit 30, each new signal S'$_1$ and S'$_2$ passing through a mixer 31-32, then a pass-band filter 33 and 34 with central frequency equal to 9960 Hz. A phase shifter 35 plays the same role as phase shifter 24 at the input of the two summing circuits 36 and 37 which deliver the two signals representing the two side-bands B+ and B−, but without them being frequency modulated since the position of the central antenna cancels out the Doppler effect due to the theoretical movement of the 48 other antennae with respect to this latter.

The means for detecting antennae breakdowns placed in this second processing device are then formed by the assembly 29 of means separating the two ±9960 Hz side-bands and by two circuits 39 for measuring the amplitude variations of the signals representing these two bands. Thus, on each signal leaving summing circuits 36 and 37, and representing the two side-bands independently of each other, it is much easier to notice a transmission breakdown of one or more antennae than on a signal delivering the two side-bands simultaneously as in the prior art.

The means providing the phase difference between the carrier frequency of the VHF wave and the phantom carrier frequency of the two side-bands are formed by the assembly 29 already described followed by a circuit 38 effecting the phase measurement of two LF signals at the same frequency, in accordance with any known device such as a counter.

Thus there has been described a monitor device applied to the Doppler VOR system and whose principal advantages are the following:

increased reliability in controlling the signal emitted by the VOR, thanks to the independent monitoring of the upper and lower ±9960 Hz side-bands of the amplitude modulation of the VHF carrier wave and thanks to the effective control of the VHF phase relationships between the carrier wave and the side-bands. It is possible, with this device, to place several sensors in different directions, which then enables either a maintenance error curve to be formed, or the exactness of the VOR information in these directions to be checked;

easy implementation, whatever the relief close to the Doppler VOR system;

absence of sensitivity to parallax.

We claim:

1. A monitor device for a radio nagivation system of the Doppler VOR type, which system comprises a central antenna radiating omnidirectionally a very high frequency carrier wave amplitude modulated by a first reference 30 Hz frequency sinusoidal signal and a circular network of antennae radiating two ±9960 Hz side-bands of the amplitude modulation of the VHF carrier wave, said side-bands being themselves frequency modulated by a second variable 30 Hz frequency sinusoidal signal whose phase varies with respect to that of the first 30 Hz signal, comprising means for monitoring the signal emitted by said Doppler VOR system, said means comprising:

a sensor placed in the vicinity of the transmitting antennae of said VOR system;

a first device for processing the signal received by said sensor, said first processing device itself comprising:

means for separating the two side-bands;

means for providing said variable 30 Hz signal from said two side-bands;

first means for measuring the modulation rate of said reference 30 Hz signal from the signal received by said sensor;

second means for measuring the continuous component of the signal received by said sensor; and third means for measuring the phase difference between said reference 30 Hz signal from said first measuring means and said variable 30 Hz signal from said providing means.

2. A monitor device as claimed in claim 1, comprising a second device for processing the signal emitted by the Doppler VOR system and received by said central antenna comprising itself:

means for separating said two side-bands;

means for detecting antennae breakdowns by measuring the amplitude variations of said two side-bands; and means for monitoring the phase difference between the phantom carrier of said two side-bands and the VHF carrier.

3. The monitor device as claimed in claim 1, wherein said means for separating the two ±9960 Hz side-bands of the first device for processing the signal received by the sensor comprises:

a divider circuit separating the signal received into two identical signals, two mixer circuits driven by said two identical signals and by the standards of the VHF frequency of the carrier wave emitted by the omnidirectional central antenna and supplying the additional signals, two pass-band filters filtering said additional signals, a phase shifter for shifting the phase of the filtered signal from one of said filters by 90 degrees with respect to the filtered signal from the other filter, two summers combining the filtered and shifted signals so as to provide separately the two side-bands centered on the frequency 9960 Hz.

4. A monitor device claimed as in claim 1, wherein said means for providing said variable 30 Hz signal from said two side-bands comprises:

two discriminators supplying said two variable 30 Hz signals modulating respectively in frequency said two side-bands; and a summing circuit adding two variable 30 Hz signals to give said variable 30 Hz sinusoidal signal.

5. The monitor device as claimed in claim 2, wherein said means for separating the two side-bands of the second device for processing the signal received by the central antenna comprises:

a divider circuit separating the signal received into two identical signals, two mixer circuits driven by said indentical signals by the standards of the VHF frequency of the carrier wave, two pass-band filters filtering the signals from the mixers, a phase shifter shifting the phase of the signal from one of the filters by 90 degrees, two summing circuits combining the signal from said phase shifter and that from the other filter to provide separately the two side-bands.

* * * * *